United States Patent Office 2,878,194
Patented Mar. 17, 1959

2,878,194

METHOD FOR MAKING CELLULAR VINYL AROMATIC POLYMERS USING NEOPENTANE AS THE BLOWING AGENT

Louis C. Rubens, Midland, Mich., assignor to The Dow Chemical Company, Midland, Mich., a corporation of Delaware No Drawing. Application November 23, 1956
Serial No. 623,770

11 Claims. (Cl. 260—2.5)

This invention concerns a method and agent for foaming vinyl aromatic polymers to obtain a cellular product. It relates more particularly to neopentane as a normally gaseous agent for expanding a thermoplastic vinyl aromatic polymer to obtain a cellular article.

It is known to prepare a cellular product from vinyl aromatic polymers, e. g. a polystyrene, by dissolving a normally gaseous agent such as methyl chloride, dimethyl ether, butylene, etc., in the polymer under pressure to form a mobile gel and thereafter expanding the gel by release of the pressure.

It has been proposed to make cellular or porous polystyrene by polymerizing styrene in admixture with a volatile organic liquid, e. g. pentane, to obtain a solid polymeric product containing the volatile liquid dispersed throughout and thereafter heat the polymer at a temperature above the boiling point of the organic liquid and above the softening point of the polystyrene, whereby the volatile organic compound by vaporizing expands the polystyrene to yield a porous or cellular mass.

It has now been discovered that neopentane (tetramethylmethane) is a particularly effective volatile organic compound for making cellular bodies from vinyl aromatic polymers. More specifically, it has been found that neopentane has a combination of properties which render it superior as a volatile organic compound for foaming vinyl aromatic polymers to make cellular products, and that these properties can advantageously be utilized in preparing polymeric compositions consisting essentially of a vinyl aromatic polymer containing the neopentane uniformly dispersed throughout, which compositions are superior for making cellular vinyl aromatic polymer articles or masses as hereinafter described.

Among the advantages which I have found result from employing neopentane as the blowing or foaming agent for making cellular articles from thermoplastic vinyl aromatic polymers containing at least 80 percent by weight of a monovinyl aromatic hydrocarbon, e. g. styrene, chemically combined in the polymer molecule are: (a) rapid expansion of the polymer to form a cellular body composed for the most part of uniform fine cells; (b) high blowing efficiency to produce a foam of good cell structure having a low bulk density; (c) ready introduction into polymeric compositions by polymerizing monovinyl aromatic compounds in admixture with the neopentane; (d) little or no effect on the polymerization rate of the monomeric vinyl aromatic compound or on the molecular weight of the polymer which is formed; (e) prolonged storage life at ordinary temperatures and atmospheric pressure for polymeric compositions of vinyl aromatic polymers containing the neopentane uniformly dispersed throughout, i. e. little or no tendency for the neopentane to diffuse from the solid or unfoamed vinyl aromatic polymer under ordinary conditions; and (f) little tendency of the foamed cellular products to undergo dimensional change or form, e. g. by shrinking, cracking or warping, during its preparation.

The vinyl aromatic polymers to be employed are the thermoplastic polymers containing at least 80 percent by weight of one or more monovinyl aromatic compounds such as monovinyl aromatic hydrocarbons or nuclear halogenated derivatives thereof chemically combined in the polymer molecule. Examples of monovinyl aromatic compounds which can be employed in making the polymers are styrene, vinyltoluene, vinylxylene, ethylvinylbenzene, ethylvinyltoluene, isopropyl styrene, tert.-butylstyrene, chlorostyrene, dichlorostyrene, fluorostyrene, or ar-chlorovinyltoluene. Copolymers containing at least 80 percent by weight of any one or more of such monovinyl aromatic compounds chemically combined with other monoethylenically unsaturated organic compounds such as alphamethyl styrene or methyl methacrylate can also be used. Other suitable polymers are copolymers of any one or more monovinyl aromatic compounds such as styrene, vinyltoluene or fluorostyrene cross-linked with from 0.01 to 0.5 percent by weight of a divinyl aromatic compound, e. g. divinylbenzene, divinyltoluene or divinylethylbenzene.

The neopentane can be incorporated with the polymer in any of several ways. For example, the polymer in powdered, granular or solid form can be heat-plastified in a Banbury mixer or plastics extruder and mechanically mixed or compounded with the neopentane in such gas-tight vessel to uniformly disperse the neopentane throughout the polymer. Such polymeric composition can be extruded at temperatures above the softening point of the polymer, e. g. at temperatures between 90° and 150° C. and foamed to obtain a cellular product. The neopentane is advantageously incorporated with the polymer by dissolving the neopentane in the monomer, or a solution of the monomer, in the presence of the desired amount of the neopentane to obtain a solid polymeric composition having the neopentane uniformly dispersed throughout.

The polymerization can be carried out in mass or in an inert liquid reaction medium which is a non-solvent for the ingredients such as water or brine. The polymerization is preferably carried out in an aqueous reaction medium since it permits ready control of the reaction and the obtaining of the polymer in the form of small particles or rounded beads. The polymerization can be carried out at temperatures between about 60° and 120° C., preferably from 75 to 100° C. and under a pressure at least as great as that of the mixture of the materials.

The polymerization is accelerated by the addition of compounds which provide oxygen such as benzoyl peroxide, lauroyl peroxide, tert.-butyl peroxide, di-tert.-butyl peroxide, cumene hydroperoxide, tert.-butyl perbenzoate, di-tert.-butyl perphthalate, etc. Such peroxide catalysts are usually employed in amounts corresponding to from 0.001 to 0.5 percent by weight of the monomers.

The polymeric compositions consisting essentially of the solid thermoplastic vinyl aromatic polymer containing the neopentane uniformly dispersed throughout at ordinary temperatures and atmospheric pressure are latent foaming compositions, i. e. they can be stored for prolonged periods of time with little, or no appreciable, loss of the neopentane by diffusion from the polymer and they can be foamed to obtain cellular articles by heating the polymer to its softening point or above, e. g. to temperatures between 90° and 150° C. such that the vapors of the neopentane expand the softened polymer with resultant formation of a cellular body. Granules of the polymeric compositions can be expanded in a mold such that the expanding granules exert a pressure against one another and against walls defining said mold, whereby the expanding particles flow together to form shaped articles having a desired configuration. The neopentane blowing agent being a poor solvent for the vinyl aromatic polymers results in the formation of foamed articles which have little tendency to undergo dimensional change such as shrinking, cracking, or warping upon cooling of the foamed article to room temperature and permits, for example, the removal of a shaped cellular article from a mold while it is still warm, thereby increasing the number of molded cellular articles that can be made in a given period of time. Cellular masses or shaped cellular articles having a specific gravity between 0.2 and 0.005, can be prepared depending in part upon the conditions employed and the proportion of neopentane used. The neopentane is usually employed in amount corresponding to from 2 to 15 grams of the neopentane for 100 grams of the polymer. Cellular articles or masses prepared employing appreciable amounts of the neopentane, e. g. from 8 to 15 grams per 100 grams of the polymer, can be foamed or expanded to greater volume and corresponding lower density by continued heating of the same at temperatures above the softening point of the polymer or by subjecting the cellular mass to successive heating and cooling operations for a repeated number of times.

The following examples illustrate ways in which the principle of the invention has been applied, but are not to be construed as limiting its scope.

EXAMPLE 1

A charge of 25 grams of styrene containing 0.5 percent by weight of benzoyl peroxide as polymerization catalyst was placed in a glass ampoule and cooled to —70° C. Two grams of neopentane was added and the ampoule sealed. The ampoule was allowed to warm to room temperature, then was heated at 80° C. for 2 days, 100° C. for 1 day and 125° C. for 1 day to polymerize the styrene. The ampoule was cooled, then broken and the product removed. The product was a solid block of the polystyrene containing the neopentane dispersed throughout. Test pieces of the product were cut from the block and were used to determine a foamimng characteristic for the product by placing the same in an air oven maintained at a temperature of 130° C. and observing the volume of the foamed product after 6 minutes. The product foamed to form a cellular body having a foam volume 36 times as great as the initial volume of the test piece. The cellular body was composed of the expanded polymer having uniform fine cells.

In contrast a product prepared from styrene and isopentane in similar manner and in similar proportions foamed to yield a cellular product having a foam volume of only 6.5 times as great as the initial volume of the test piece.

EXAMPLE 2

A mixture of 25 grams of styrene containing 0.5 percent by weight of benzoyl peroxide as polymerization catalyst and 1.25 grams of neopentane was sealed in a glass ampoule and polymerized, employing procedure as described in Example 1. Test pieces of the product were foamed by placing the same in an oven at a temperature of 130° C. for a period of 6 minutes. The product foamed to a cellular mass having uniform fine cells and a volume 17 times as great as the initial volume of the test pieces.

In contrast a polymeric product prepared in similar manner from 25 grams of the styrene and 1.25 grams of n-pentane, foamed to a volume only 3.2 times as great as the initial volume of the test piece.

EXAMPLE 3

A mixture of 25 grams of styrene containing 0.5 percent by weight of benzoyl peroxide as polymerization catalyst and 2.5 grams of neopentane was sealed in a glass ampoule and polymerized by heating the same at 80° C. for 2 days; 100° C. for 1 day and 125° C. for 1 day. Thereafter, the ampoule was cooled, then broken and the product removed. The product was a solid block of polystyrene containing the neopentane uniformly dispersed throughout. Test pieces were cut from the block and heated in an air oven at a temperature of 130° C. for a period of 8 minutes to determine a foaming characteristic for the product.

For purpose of comparison, styrene was polymerized with n-pentane and with isopentane in similar manner to form a solid product and was tested in the same way. Table I identifies the experiments by naming the volatile compound or foaming agent employed and gives a foaming characteristic for the product expressed as the ratio of the volume of the foamed product to the initial volume of the test piece.

Table I

| Run No. | Volatile Compound | Foam Volume/Initial Volume | Remarks |
| --- | --- | --- | --- |
| 1 | Neopentane | 50 | very small cells. |
| 2 | Isopentane | 18.5 | 1/16″–1/8″ cells. |
| 3 | n-pentane | 13.5 | Do. |

EXAMPLE 4

In each of a series of experiments, a charge of 25 grams of a mixture of 99.90 percent by weight of styrene, 0.04 percent of ethylvinylbenzene and 0.06 percent of divinylbenzene, together with 0.5 percent by weight of benzoyl peroxide as polymerization catalyst and neopentane in amount as stated in the following table was sealed in a glass ampoule and polymerized by heating the same at 80° C. for 2 days, 100° C. for 1 day and 125° C. for 1 day. Thereafter, the ampoule was cooled, then broken and the polymeric product removed. The product was a solid block of polymeric material containing the neopentane uniformly dispersed throughout. Test pieces were cut from the polymeric product and heated in an air oven at a temperature of 130° C. for a period of 8 minutes to determine a foaming characteristic for the product. Table II identifies the experiment by giving the proportion of neopentane employed based on the weight of the monomer and gives a foaming characteristic for the polymeric product expressed as the ratio of the volume of the foamed material to the initial volume of the test pieces.

Table II

| Run No. | Neopentane, Percent | Foam Volume/ Initial Volume | Remarks |
| --- | --- | --- | --- |
| 1 | 5 | 22 | fine cells. |
| 2 | 8 | 41 | Do. |
| 3 | 10 | 67 | Do. |

EXAMPLE 5

In each of a series of experiments, a charge of 20 grams of isomeric dichlorostyrenes, together with 0.1 percent by weight of benzoyl peroxide as polymerization catalyst, and neopentane in proportions as stated in the following table was sealed in a glass ampoule. The dichlorostyrene employed in the experiments was a mixture of isomers consisting of about 46 percent by weight of 2,4-dichlorostyrene, 34 percent 2,5-dichlorostyrene, 14 percent 2,3-dichlorostyrene, 3 percent 3,4-dichlorostyrene and 3 percent 2,6-dichlorostyrene. The dichlorostyrene was polymerized by heating the same in the ampoule in admixture with the neopentane under time and temperature conditions as follows: 2 days at 50° C. and 3.75 days at 90° C. Thereafter, the ampoule was cooled, broken and the polymeric product removed. The product was a solid block of the polymerized dichlorostyrenes containing the neopentane uniformly dispersed throughout. Test pieces were cut from the polymeric product and foamed by immersing the same in an oil bath at a temperature of 150° C. for a period of 3 minutes and determining the volume of the foamed material. Table III identifies the experiments by giving the proportion of neopentane, based on the weight of the monomers, employed in making the polymeric product and gives a foaming characteristic for the product expressed as the ratio of the volume of the foamed material to the initial volume of the test piece.

*Table III*

| Run No. | Neopentane, Percent | Foamed Volume/ Initial Volume | Remarks |
|---|---|---|---|
| 1 | 5 | 38 | Uniform fine cells. |
| 2 | 8 | 39.7 | Do. |
| 3 | 10 | 46.3 | Do. |
| 4 | 13 | 46.7 | Do. |

EXAMPLE 6

A charge of 80 pounds of styrene, containing 0.0025 percent by weight of benzoyl peroxide as polymerization catalyst and 5.6 pounds of neopentane, was added to a reaction vessel containing 120 pounds of water containing 0.09 percent by weight of methyl cellulose. The mixture was stirred and heated at a temperature of 82° C. under the autogenous pressure of the mixture of the materials for a period of 18 hours, then was cooled to room temperature. The pressure was released, the product removed, washed and dried. The product was in the form of coarse granules. It was ground to fine particles corresponding to about 20 mesh per inch as determined by a U. S. standard screen. This product was analyzed and found to contain about 6.8 percent by weight of neopentane and 0.5 percent of unpolymerized styrene.

EXAMPLE 7

A charge of 28 grams of the granular 20 mesh per inch polymeric product containing the neopentane dispersed throughout, prepared in Example 6 was placed in a spheroidal mold cavity having axes of 4 and 4.5 inches. The mold was closed and heated with steam at 30 pounds per square inch gauge pressure (about 135° C.) for a period of 10 seconds, then was immediately cooled in water at room temperature and was opened as soon as the steel mold was cool enough to handle with bare hands. The granules of the polymeric starting material which were placed in the mold cavity had expanded to completely fill the mold, and by exerting pressure on walls of the mold and on one another had flowed together to form a spheroidal body having the shape of the mold. The cellular product was composed of uniform fine cells smaller than could be distinguished with the naked eye. The product had a density corresponding to 2.7 pounds per cubic foot of the foamed material.

I claim:

1. In a method of making a cellular body from a vinyl aromatic polymer wherein a solid polymeric composition comprising a thermoplastic vinyl aromatic polymer consisting essentially of at least 80 percent by weight of at least one monovinyl aromatic compound which is a member of the group consisting of monovinyl aromatic hydrocarbons and nuclear halogenated monovinyl aromatic hydrocarbons, chemically combined in the polymer molecule and having a volatile organic compound in which the polymer is insoluble uniformly dispersed throughout is expanded by heating the composition to a temperature above the softening point of the polymer and above the boiling point of the volatile organic compound, the improvement which consists in employing neopentane as the volatile organic compound and expanding the polymer by heating it at temperatures between 90° and 150° C.

2. A method as claimed in claim 1, wherein the vinyl aromatic polymer is polystyrene.

3. A method as claimed in claim 1, wherein the neopentane is employed in amounts corresponding to from 2 to 15 grams of the neopentane per 100 grams of the polymer.

4. A method of making a cellular body from a vinyl aromatic polymer, which method comprises forming a solid polymeric composition comprising a thermoplastic vinyl aromatic polymer consisting essentially of at least 80 percent by weight of at least one monovinyl aromatic compound which is a member of the group consisting of monovinyl aromatic hydrocarbons and nuclear halogenated monovinyl aromatic hydrocarbons, chemically combined in the polymer molecule and neopentane in amount corresponding to from 2 to 15 grams of the neopentane per 100 grams of the polymer, said polymeric composition having the neopentane uniformly dispersed throughout, and heating said polymeric composition to a temperature above the softening point of the polymer and above the boiling point of the neopentane and between 90° and 150° C. to expand the polymer and form a cellular body.

5. A method of making a cellular body from a vinyl aromatic polymer which method comprises forming a polymeric composition by dissolving neopentane in at least one polymerizable monomer selected from the group consisting of monovinyl aromatic hydrocarbons and nuclear halogenated monovinyl aromatic hydrocarbons, mixtures of at least 80 percent by weight of at least one such monovinyl aromatic compound and not more than 20 percent of another monoethylenically unsaturated organic compound copolymerizable therewith, and mixtures of from 99.5 to 99.99 percent by weight of at least one monovinyl aromatic hydrocarbon and from 0.5 to 0.01 percent of a divinyl aromatic hydrocarbon, in amounts corresponding to from 2 to 15 grams of the neopentane per 100 grams of the monomer, polymerizing the monomer by heating the mixture at temperatures between 60 and 120° C. under a pressure at least as great as the autogenous pressure of the mixture of the materials to obtain a solid polymeric composition containing the neopentane dispersed throughout and heating said polymeric composition to temperatures between 90° and 150° C. and at temperatures above the boiling point of the neopentane to expand the polymer and form a cellular body.

6. A method as claimed in claim 5, wherein the monomer is a monovinyl aromatic hydrocarbon.

7. A method as claimed in claim 5, wherein the monomer is a nuclear halogenated monovinyl aromatic hydrocarbon.

8. A method as claimed in claim 5, wherein the monomer is a mixture of from 99.5 to 99.99 percent by weight of a monovinyl aromatic hydrocarbon and from 0.5 to 0.01 percent of a divinyl aromatic hydrocarbon.

9. A method as claimed in claim 6, wherein the monovinyl aromatic hydrocarbon is styrene.

10. A method as claimed in claim 7, wherein the nuclear halogenated monovinyl aromatic hydrocarbon is dichlorostyrene.

11. A method as claimed in claim 8, wherein the monovinyl aromatic hydrocarbon is styrene and the divinyl aromatic hydrocarbon is divinylbenzene.

References Cited in the file of this patent

UNITED STATES PATENTS

| | | |
|---|---|---|
| 2,409,910 | Stober | Oct. 22, 1946 |
| 2,744,291 | Stastny et al. | May 8, 1956 |